(12) United States Patent  
Mulligan (10) Patent No.: US 8,737,614 B1  
(45) Date of Patent: May 27, 2014

(54) DOCUMENT IMAGING SYSTEM WITH IDENTITY-BASED ENCRYPTION

(75) Inventor: David M. Mulligan, Santa Cruz, CA (US)

(73) Assignee: Voltage Security, Inc., Cupertino, CA (US)

( * ) Notice: Subject to any disclaimer, the term of this patent is extended or adjusted under 35 U.S.C. 154(b) by 965 days.

(21) Appl. No.: 12/168,800

(22) Filed: Jul. 7, 2008

(51) Int. Cl.  
*H04L 9/30* (2006.01)

(52) U.S. Cl.  
USPC ............................................. 380/243; 380/30

(58) Field of Classification Search  
USPC .......................................................... 380/243  
See application file for complete search history.

(56) References Cited

U.S. PATENT DOCUMENTS

| | | | |
|---|---|---|---|
| 5,398,283 A * | 3/1995 | Virga | 380/243 |
| 5,754,673 A * | 5/1998 | Brooks et al. | 382/112 |
| 8,467,530 B2 * | 6/2013 | Suleiman et al. | 380/243 |
| 2003/0070072 A1 | 4/2003 | Nassiri | |
| 2003/0081785 A1 * | 5/2003 | Boneh et al. | 380/277 |
| 2005/0060545 A1 | 3/2005 | Mont et al. | |
| 2005/0138353 A1 * | 6/2005 | Spies et al. | 713/153 |
| 2006/0072749 A1 * | 4/2006 | Gava | 380/200 |
| 2006/0123238 A1 | 6/2006 | Kacker et al. | |
| 2008/0013727 A1 * | 1/2008 | Uemura | 380/243 |

* cited by examiner

*Primary Examiner* — Minh Dinh  
(74) *Attorney, Agent, or Firm* — Treyz Law Group; G. Victor Treyz (57) ABSTRACT

A system is provided in which document imaging equipment is used to acquire a document image from a printed document. The document image may be processed using an optical character recognition application implemented on the document imaging equipment. A user may supply identifier information. The identifier information may be used in constructing an identity-based-encryption (IBE) public key. Identity-based-encryption public parameter information and the IBE public key may be used in encrypting the document image. The IBE-encrypted document image may be stored in storage or sent to a recipient in a message. A user receiving the IBE-encrypted document image may obtain an IBE private key from a key server that is used in decrypting the IBE-encrypted document.

21 Claims, 8 Drawing Sheets

| DESTINATION | ID | DECRYPTION TECHNIQUUE |
|---|---|---|
| EMAIL RECIPIENT | EMAIL ADDRESS | EMAIL CLIENT PLUGIN OR REMOTE DECRYPTION SERVICE |
| NETORK FOLDER | USERNAME OR FOLDERNAME | READER APPLICATION WITH PLUGIN |
| UNIVERSAL SERIAL BUS KEY OR OTHER MEMORY CARD DEVICE | USERNAME, REFERENCE NAME, DATE, ETC.) | READER APPLICATION WITH PLUGIN |

DOCUMENT IMAGING SYSTEM WITH IDENTITY-BASED ENCRYPTION

BACKGROUND OF THE INVENTION

This invention relates to cryptographic systems, and more particularly, to document imaging systems with identity-based encryption capabilities.

Cryptographic systems are used to provide secure communications services such as secure email services. For example, in a secure email system, a secure email message may be conveyed from a sender to a recipient over the Internet.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator.

Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

Although senders of IBE-encrypted messages need not look up a recipient's public key as with PKE schemes, senders must obtain so-called IBE public parameter information that is associated with the recipient's IBE private key generator. The IBE public parameter information is used as an ancillary input to the sender's IBE encryption algorithm and works in conjunction with the IBE public key of the recipient to ensure that the message is encrypted properly.

Individual users in an IBE system can encrypt messages locally on their computers using an IBE encryption engine that is implemented as a plug-in to an email client. In environments in which users are networked at an organization, a gateway may be used to encrypt outgoing messages for the users.

Traditional arrangements such as these do not necessarily provide desired levels of security. For example, in situations in which a user scans a document on a network-attached scanner, the communications path between the scanner and the user's computer may not be secure. This may result in documents stored in the scanner's memory or on the network that are not in encrypted form. Moreover, if a user desires to email a document directly from an email-enabled scanner, the document may be vulnerable to interception.

It would therefore be desirable to be able to provide ways in which to improve data security in communications systems, particularly in systems in which documents are created using equipment such as scanners.

SUMMARY OF THE INVENTION

In accordance with the present invention, a system is provided in which an identity-based-encryption (IBE) encryption engine is implemented on document imaging equipment such as a document scanner.

A document scanner may obtain information from a user that is used in constructing an IBE public key. The information may be a storage location, a username, a folder name, an email address, a date, a reference name, etc. Based on this information, the document scanner may construct the IBE public key. An image acquisition application may be used to scan a document and thereby produce a document image. Processing operations such as optical character recognition operations may be applied to the document image.

The IBE public key and IBE public parameter information may be used by the IBE encryption engine to encrypt the document image. The IBE-encrypted document image may be stored by a storage application. For example, the IBE-encrypted document image may be stored on removable storage connected to the document imaging equipment or may be stored in network storage. The IBE-encrypted document image may also be sent in an email or other communication to a desired recipient.

A user who receives the IBE-encrypted document image may obtain an IBE private key from an IBE private key server. The IBE private key may be used in decrypting the IBE-encrypted document image at the user's equipment or at a remote decryption service.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
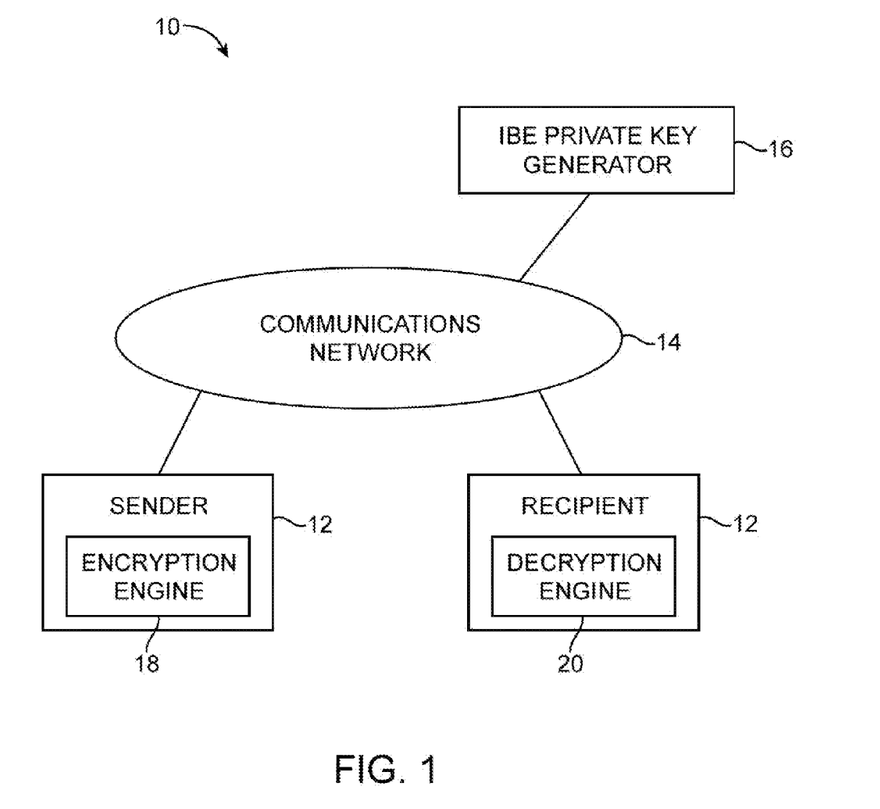
FIG. 1 is a diagram of an illustrative identity-based-encryption system in accordance with an embodiment of the present invention.

An illustrative identity-based-encryption (IBE) system 10 in accordance with the present invention is shown in FIG. 1. Data in system 10 may be secured using identity-based-encryption cryptographic techniques. In a typical scenario, the data that is to be secured in system 10 originates with document imaging equipment such as a stand-alone scanner or a copier with scanning capabilities. In some scenarios, image-based data of this type may be transmitted in a message such as an email message. In other scenarios, image-based data of this type may be stored locally or transferred using other techniques. Message-oriented uses of identity-based-encryption are described in connection with FIG. 1 as an example.

In a message-oriented scenario using the IBE system of FIG. 1, a user may send a secure message from document imaging equipment to one or more other users over a communications network 14. Each user may have associated computing equipment 12. The computing equipment of each user may be, for example, a personal computer, document imaging equipment, a handheld electronic device such as a cellular telephone, etc. One or more individuals may share a single hardware platform. For example, two or more employees at an organization may share a single personal computer or numerous workers may share a scanner with IBE capabilities. If desired, equipment may be provided with automation software. For example, an automated process may be used to distribute emails to large numbers of customers without requiring the separate involvement of an individual for each transmitted email.

Users that are associated with a network at an organization may sometimes be referred to as local users or internal users. Users in system 10 who are not associated with this local network may sometimes be referred to as remote users.

When a user is sending a message, the user may be referred to as a sender. When a user is receiving a message, the user may be referred to as a recipient. Users may, in different capacities, be both senders and recipients. Messages may include any digital information (e.g., text, graphics, audio, video, commands, executable code, data, etc.) that it is desired to convey electronically between senders and recipients in a secure manner.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 can have multiple IBE private key generators 16 (sometimes referred to as key servers). Only one private key generator 16 is shown in the example of FIG. 1. Each IBE private key generator may be used to generate IBE private keys for requesting users from a master secret. The master secret may also be used to generate IBE public parameter information. The generated IBE public parameter information may be hosted at the IBE private key generator or at another host. To avoid the encrypting user having to obtain the IBE public parameter information before each encryption operation, IBE public parameter information may be cached in the user's equipment.

Various computing devices may be used with network 14 to support secure IBE techniques. For example, computing equipment may be used to implement the functions of a server or other computer equipment at each IBE private key generator 16. Servers may also be used to support the functions of an IBE public parameter directory, an IBE public parameter host, a certificate authority, or other entities. Such servers may be co-located with a sender (e.g., a sender in an organization), may be connected to the network 14 as an independent third party service, may be part of the infrastructure of network 14, or may be used at other locations.

A server may be formed using a single computer or multiple computers. Multiple servers may be implemented on one computer. If desired, the functions of a single server may be provided by multiple computers that are physically distinct. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message, or other electronic message (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute).

Messages may be used to securely distribute multimedia or any other suitable content. As described in more detail in connection with FIG. 3, in many situations, particularly in business environments, it is desirable to generate and communicate using data produced by document imaging equipment such as a stand-alone scanner or a copier or multifunction printer that includes a scanner. As an example, a worker at a business may need to scan handwritten notes, business documents, books, objects with images and text, pictures, and other paper-based, text-based, printed, and image-based content. Scanning operations may be performed for various reasons, such as archiving, digital data distribution, etc. Digital image data that originates from a document (e.g., a digitally captured document that includes printed images and/or text) is sometimes referred to as a document image or a scanned document. In its initial form, as captured by a scanner, the document may be represented as a graphic image. Later, following processing such as optical character recognition processing, the document may at least partly be represented using text.

For clarity, the present invention is sometimes described in the context of sending email messages with document image attachments. This is merely illustrative. Any suitable type of messages may be conveyed between senders and recipients if desired. Users may also perform other tasks on document images, such as storing document images on memory keys, storing document images in a network folder or in a database, transferring document images using shared storage locations or using techniques other than email messaging techniques, etc.

Some user activities in system 10, such as sending person-to-person email messages, involve at least some manual intervention. For example, a person who desires to send a scanned document to a recipient in an email message must generally press one or more keys or buttons on the document imaging equipment or other equipment that is being used to send the message. Key presses may be used, for example, to enter or select a file name, to enter or select a recipient, to type text for a message, to initiate scanning, to initiate encryption, to initiate transmission, etc.

Other user activities in system 10 may be entirely automated so that no human intervention is generally required. For example, document imaging equipment in system 10 may be configured to automatically invoke optical character recognition, email, and IBE encryption functions whenever a document is scanned (as an example). System functions involved in presenting on-screen options for humans to respond to (e.g., by selecting them using buttons or other user interface devices on a scanner or other equipment) can be automated using software running on the components of the system.

During certain operations of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use PKE private keys and that can be verified using matching PKE public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between a recipient and a private key generator, etc.). A number of different approaches may be used to convey information over network 14 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as are used with RSA public-key cryptography. For example, the secure sockets layer protocol, which may be used to secure communications between parties when a web browser or other application is used, involves the use of certificates from trusted certificate authorities. Digital signatures can also be implemented using traditional public-key encryption techniques. These traditional public key cryptographic techniques are referred to herein as "PKE" cryptographic techniques.

The operation of system 10 also uses identity-based encryption (IBE) cryptographic techniques. These cryptographic techniques are referred to herein as IBE cryptographic techniques or IBE encryption techniques.

PKE and IBE encryption schemes use an asymmetric approach. Some information (so-called public key information) is used to encrypt data. Other corresponding information (so-called private key information) is used to decrypt the encrypted data.

To enhance the efficiency of the IBE decryption and encryption processes, "two-step" decryption techniques may be used in which a key (e.g., a symmetric message key) is used to encrypt the contents of a message or other data item (e.g., prior to transmission to the recipient). The IBE process may then be used to encrypt the key (e.g., to encrypt the symmetric message key). With this type of approach, a message that is sent from the sender to the recipient will contain the IBE-encrypted message key and the message-key-encrypted message contents. At the recipient, the recipient can use the IBE private key to decrypt the message key. The message key may then be used by the recipient to decrypt the rest of the message. These two-step processes may be more efficient than "pure" or "single step" IBE encryption algorithms in which the IBE algorithm alone is used to encrypt the entire message. Both types of approaches (and analogous multi-layer IBE encryption approaches) are often generally referred to herein as simply "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Pairing. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by users (e.g., senders) in encrypting data (e.g., messages).

After the master secret s has been obtained, the private key generator may generate the public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) may be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been generated, the IBE private key generator 16 may make this information available to senders in system 10. For example, private key generator 16 may publish the public parameter information by placing the public parameter information on a particular server that a sender can reach using an associated domain name or other suitable service name. The server may be the same server or a different server from that used to support IBE private key generator operations such as supplying IBE private keys. For clarity, illustrative arrangements in which the same server is used in implementing both IBE private key generator functions such as private key generation and public parameter host functions are described herein as an example. In this type of arrangement, an IBE private key generator may sometimes be referred to as a key server. The key server can handle operations such as user authentication, access policy enforcement, IBE private key generation, and IBE public parameter generation. These functions may be performed using cryptographic software applications that run on computing equipment such as a personal computer, a workstation, a mainframe, a network of computers, etc.

If the IBE public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted message. As another example, all users may know P in advance and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a memory card or other computer-readable media to the user). Downloaded IBE public parameter information may also be locally cached to avoid the need to look up this information online. This may be particularly advantageous in situations in which a network connection is not always available.

Once the public parameter information (e.g., public parameters P and sP) has been provided to a user (i.e., a sender) who desires to send an encrypted message to another user (i.e., a recipient), the sender may encrypt and send the message to the recipient. Message encryption may be performed using a suitable IBE public key such as the IBE public key of a desired recipient. (If desired, the recipient and sender may correspond to the same individual, for example, when a user encrypts a message at work and decrypts the message at home.) Message decryption may be performed using a corresponding IBE private key. Encryption and decryption operations may, in general, be performed at the user's equipment (e.g., on the personal computer of a sender or recipient, on document imaging equipment, etc.), on equipment associated with a user's organization (e.g., a gateway or other equipment associated with a user's organization other than the user's workstation), or using services at remote locations (e.g., servers that are accessible over the internet). Remotely located services may be implemented by third parties, by an organization associated with a sender or recipient, or using other suitable arrangements.

Consider, as an example, the arrangement of FIG. 1. In this type of arrangement, an IBE encryption engine 18 implemented on a sender's equipment may be used to encrypt a message. The IBE encryption engine 18 may use the public parameter information (e.g., P and sP) and the IBE public key associated with a recipient to perform message encryption. When the recipient receives the IBE-encrypted message, or earlier, when the recipient sets up or updates the equipment at the recipient's location, the recipient may obtain the recipient's IBE private key from the IBE private key generator 16 to use in decrypting the message. The recipient may use an IBE decryption engine 20 implemented on the recipient's equipment to decrypt the message.

The IBE encryption engine 18 and decryption engine 20 may use software to implement the desired IBE encryption and decryption algorithms. Engines 18 and 20 may be provided to users in the system as part of the users' initially-loaded messaging software, as a downloadable program or plug-in, as part of the original software on a piece of equipment, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional PKE schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as 1/2/2003-1/10/03, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

According to the validity period, it is not permissible to access the contents of the encrypted message if the current date does not fall within the validity period. The policy may be enforced by the private key generator 16. If the current date is not within the validity period specified in the public key, the private key generator 16 will refuse to generate and provide an otherwise authorized message recipient with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information or other identifiers and additional criteria may be used if desired.

A sender desiring to send an IBE-encrypted message should have information sufficient to construct the IBE public key Q (e.g., the IBE public key of the intended message recipient). This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that can be used in determining which parties are allowed to access the contents of the message and under what conditions such access is permitted.

The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18 (as an example). The encryption engine 18 may be a stand-alone process or application or may be incorporated into another process or application. If desired, such a process or application (whether stand-alone or multi-function) may be referred to as a user's "client" software or "client." An IBE encryption engine such as IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

The sender may transmit the encrypted message to the recipient using an email program or other suitable software. After the sender transmits the IBE-encrypted message to the recipient over communications network 14, the recipient may receive the message. The recipient may decrypt the received message using an appropriate IBE private key. The recipient may use decryption engine 20 to decrypt the message. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only an appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

The recipient's authorization to receive the message may be verified using authentication information (credentials) from the recipient and using other information (e.g., independently-gathered information on the current date). The private key generator 16 may use an access policy embodied in the IBE public key to determine whether a given recipient is authorized. Once the IBE private key generator 16 verifies that the recipient is authorized to access the message contents, the private key may be issued to the recipient by the IBE private key generator 16.

If desired, the IBE private key generator 16 and the recipient may use intermediate parties as agents during the process of providing recipient credentials, verifying the recipient's authorization to access the message content, and providing the IBE private key. In general, any suitable manual or automatic authentication technique may be used by the IBE private key generator 16 to verify that the recipient (or the recipient's agent) is authorized to receive the IBE private key prior to issuing the key to the recipient.

Regardless of how the IBE private key generator 16 determines that the recipient is authorized to obtain the IBE private key, in arrangements in which the recipient's client handles decryption operations, the private key should be provided to the recipient for use in decrypting the message. Any suitable technique may be used to provide the IBE private key to the recipient. For example, the private key may be transmitted to the recipient in an email or other suitable message or may be made available for downloading over the Internet or other network (as part of a stand-alone downloadable application or a downloadable plug-in module, as a stand-alone key, etc.). A secure communications channel may be used for electronic communications between the IBE private key generator 16 and the recipient's equipment 12.

The recipient may, if desired, store the private key locally (e.g., in a database on a storage device such as a memory circuit or hard drive on the recipient's equipment). If the private key is stored locally (and has not expired or otherwise become obsolete), the recipient can retrieve it the next time a message needs to be decrypted without needing to contact the IBE private key generator 16 to obtain a new copy of the IBE private key over the communications network.

The sender may cache public parameter information on the sender's equipment in a similar fashion to facilitate retrieval of the public parameter information when it is desired to send an encrypted message.

Figure 2:
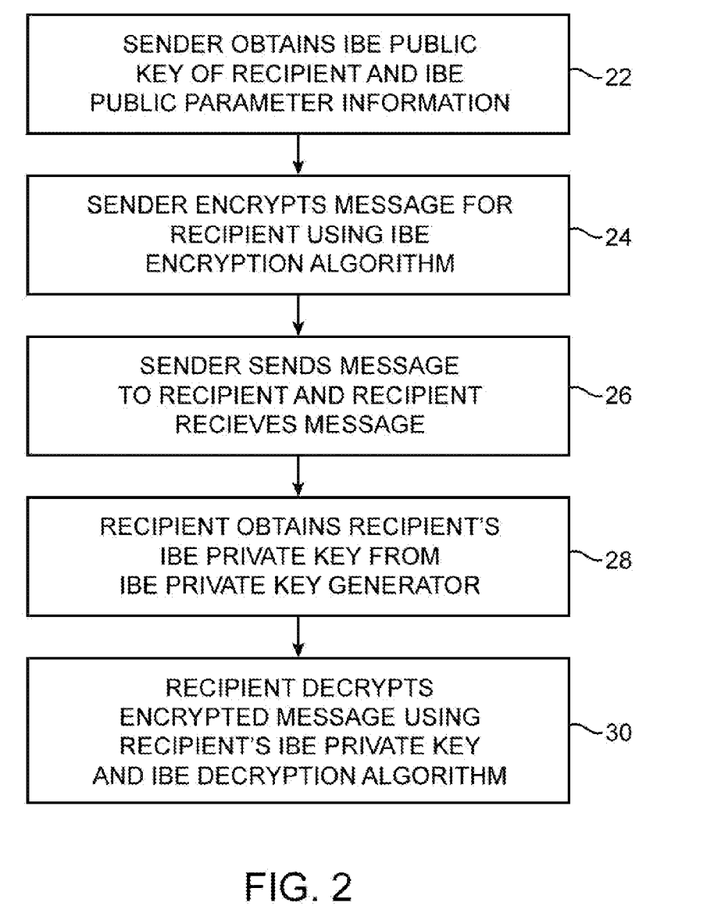
FIG. 2 is a flow chart of illustrative steps involved in using identity-based-encryption techniques to support secure messaging in accordance with an embodiment of the present invention.

Illustrative steps involved in using IBE-encryption to convey a secure message from a sender to a recipient in system 10 are shown in FIG. 2. At step 22, the sender may obtain the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other generally-applicable access policy information, and by using this information to generate Q). The IBE public parameter information may be obtained from the recipient or other suitable party, may be obtained over a local network, may be obtained over network 14 from a directory service (e.g., a directory service implemented on a server connected to network 14), or may be obtained over network 14 from a generator 16 or a host associated with the IBE private key generator 16 that generated the public parameter information. The IBE public key Q and IBE public parameter information may be cached locally by the sender for later retrieval if desired.

At step 24, the sender may use IBE encryption engine 18 (FIG. 1) to encrypt a message for the recipient.

The IBE-encrypted message may be sent to the recipient over network 14 and received by the recipient at step 26. The message may be accompanied by information on the IBE public key Q that was used to encrypt the message, information on which organization the sender is affiliated with (e.g., an organization name), a service name associated with one or more key generators, etc. This information may be used by the recipient in determining which private key generator 16 to contact at step 28 to obtain the IBE private key needed to decrypt the message.

To obtain the IBE private key from the private key generator at step 28, the recipient may provide information on Q (e.g., Q, a precursor of Q, or a derivative of Q) to the private key generator that the private key generator can use to determine which private key is being requested (and which access policies apply). The recipient can provide the private key generator with recipient credentials such as username and password information, biometric information, age information, and other suitable identity and authentication information that the private key generator 16 may use to verify that the recipient is authorized to obtain the requested IBE private key.

If desired, a private key generator may use its own information (e.g., information on the current time and date) as well as recipient-provided information in determining whether or not a given recipient is authorized to obtain the IBE private key. During the authentication process, the recipient and the IBE private key generator may communicate using secure communications (e.g., using PKE-encrypted messages, a trusted communications path, a secure communications link such as an SSL or TLS link, etc.).

When a private key generator 16 determines that the recipient is authorized to obtain a copy of the IBE private key, the private key may be provided to the recipient securely at step 28 (e.g., in a secure message or over a secure communications link in network 14).

At step 30, after the recipient has obtained the appropriate IBE private key, the recipient may use this private key with decryption engine 20 (FIG. 1) to decrypt the encrypted message.

In many office environments, document images are generated using scanners. For example, personnel at an office may ask customers to fill out and sign paper forms. Forms of this type may then be scanned to create digital representations of the paper forms. An illustrative version of system 10 containing document imaging equipment such as a scanner is shown in FIG. 3.

Figure 3:
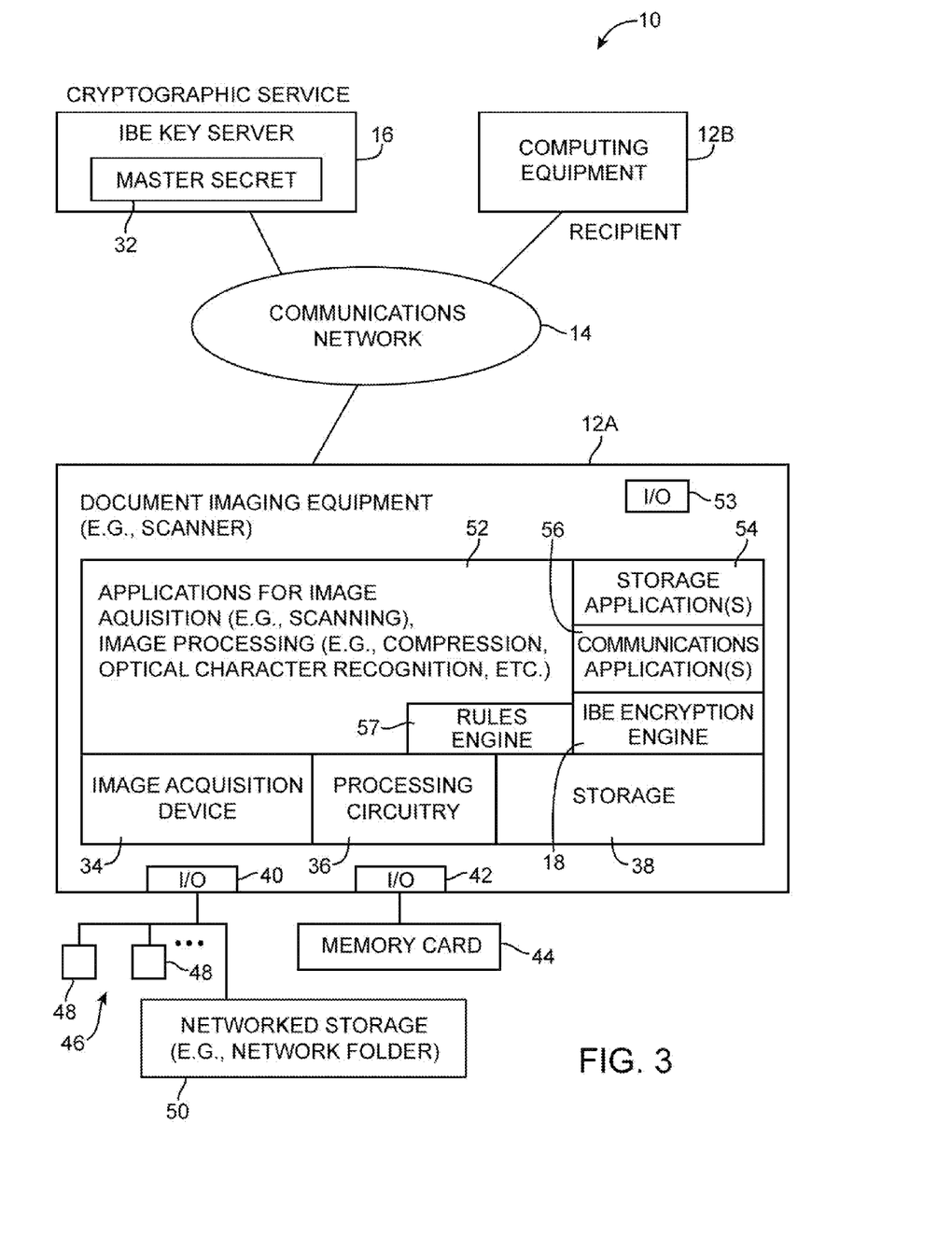
FIG. 3 is a diagram of a system including document imaging equipment with IBE encryption capabilities in accordance with an embodiment of the present invention.

As shown in FIG. 3, system 10 may have document imaging equipment 12A for capturing images of documents. Document imaging equipment 12A may be, for example, a stand-alone scanner, a scanner with copier functionality, a multifunction printer with an integrated scanner, or any other suitable equipment for acquiring images of documents. In a typical scenario, document imaging equipment 12A may include a flat-bed structure that allows items such as books and individual sheets of paper to be scanned and a paper-feed mechanism that allows multipage documents to be processed.

A user in system 10 may capture and encrypt a document (i.e., a document image) using an IBE encryption process implemented on document imaging equipment 12A. At computing equipment 12B, the IBE-encrypted version of the document image may be decrypted and presented to a user. Equipment 12B may be, for example, a personal computer. The decrypting user at equipment 12B may be the same individual as the individual who encrypted the document or a different individual.

IBE key server 16 may have a master secret 32 for generating IBE public parameter information and IBE private keys. IBE key server 16 may be used to provide IBE public parameter information to encrypting users such as a user who desires to encrypt a document image at document imaging equipment 12A. IBE key server 16 may also be used to provide IBE private keys to users who desire to decrypt IBE-encrypted document images. Users may decrypt documents on their local computers (e.g., at computing equipment 12B) using an IBE decryption engine or may decrypt documents remotely (e.g., at a cryptographic service associated with IBE key server 16).

The arrangement of FIG. 3 secures document images with IBE encryption at their source. As a result, document images need not be passed in the clear between document imaging equipment 12A and other equipment (e.g., a network server being used to maintain a network folder or other shared document repository).

As shown in FIG. 3, document imaging equipment may include hardware components such as image acquisition device 34, processing circuitry 36, and storage 38. Input acquisition device 34 may be a scan head that has an image sensor such as a charge-coupled device (CCD) array. Processing circuitry 36 may include circuitry for controlling image acquisition device 34 and for implementing hardware-based and software-based functions. Processing circuitry 36 may include application specific integrated circuits, image processing circuits, analog-to-digital converters, logic gates, microprocessors, etc. Storage 38 may include volatile and non-volatile storage devices such as hard disk drives, solid state memory, random-access memory, read-only memory, etc.

Input-output devices 53 such as buttons and displays may be used to receive user input.

Input-output circuitry may be used to interconnect document imaging equipment 12A to other equipment. For example, document imaging equipment 12A may include input-output circuitry 42 to support communications between document imaging equipment 12A and a removable memory card such as memory card 44. Circuitry 42 may be, for example, a universal serial bus circuit that supports the functions of a USB port. Memory card 44 (in this example) might be a USB memory key. Circuitry 42 may also, if desired, include card reader structures that support other memory card formats or removable hard drives. Input-output circuitry 40 may include an Ethernet port or other network adapter that may be used to connect document imaging equipment 12A to communications network 14 and/or local area network 46. Local area network 46 may include networked storage 50 (e.g., storage on a server or a network-attached drive) and other equipment 48 (e.g., personal computers and other equipment such as computing equipment 12B, peripherals, etc.). Key server 16 may be connected to network 46 if desired.

Functions such as image acquisition, image processing, data encryption, data storage, and communications may be handled using software that is run on equipment 12A. Software may be stored, for example, in storage 38. Code may be executed using processing circuitry 36.

As shown in FIG. 3, software in document imaging equipment 12A may include applications for image acquisition 52, storage applications 54, communications applications 56, and an IBE encryption engine 18. Code for these applications may be implemented as part of an operating system, as stand-alone applications, as plug-ins to other applications, as processes that are invoked by plug-ins, that are invoked by an operating system on the document imaging equipment or that are invoked by applications. A combination of these arrangements or any other suitable software configuration may also be used. For clarity, the code on document imaging equipment 12A that is used to implement image acquisition and processing functions, storage and communications functions, and cryptographic functions is sometimes referred to herein as applications or software, regardless of the particular software configuration used to implement these functions.

Applications 52 may include an image acquisition application. An image acquisition application may be used in capturing scanned images. For example, an image acquisition application may be used in scanning a printed document to generate a scanned image. The scanned image may be represented using TIFF (Tag Image File Format) or PDF (Portable Document Format) files (as examples). The scanned image may be in color or may be in black and white. As part of the image acquisition process or following initial image acquisition, an image processing application 52 may be used to perform operations such as removing stray marks, page straightening, adjusting contrast, adjusting brightness, etc. Image processing application 52 may also be used to perform operations such as image compression. If desired, image processing application 52 may include an optical character recognition application that processes an acquired image to extract text characters.

IBE encryption engine 18 may be used to encrypt a document image. Document images can be encrypted while in image-data form (e.g., as a PDF image) or following optical character recognition processing (e.g., as a text file or a file that contains text and graphics). In performing encryption, IBE encryption engine 18 may use as inputs (1) document image data, (2) IBE public parameter information, and (3) an IBE public key. The document image data may be obtained by scanning a document using image acquisition device 34. The IBE public parameter information may be obtained from key server 16 and may, if desired, be cached in local storage within document imaging equipment 12A such as storage 38. The IBE public key may be generated based on known rules (e.g., by constructing the IBE public key from an identity such as a recipient's email address, date and time information, policy information, etc.)

Document images that have been encrypted using identity based encryption (IBE-encrypted image documents) may be distributed using any suitable technique. For example, communications application 56 may include email functions or other messaging functions that allow application 56 to be used to transmit the IBE-encrypted version of a document image to a recipient via email. Storage application 54 may be used to store the IBE-encrypted image document in one or more suitable storage locations. Examples of suitable storage locations include storage 38 on document imaging equipment 12A, removable storage 44, and networked storage 50 in local area network 46. In situations in which the location in which the IBE-encrypted document image is accessible to both the user who initially captured the document image and the intended recipient of the document image, the process of storing the encrypted document may serve as a mechanism for transferring the document between users. Storage application 54 may be controlled using buttons on document imaging equipment 12A (shown schematically as I/O devices 53 in FIG. 3).

Figure 4:
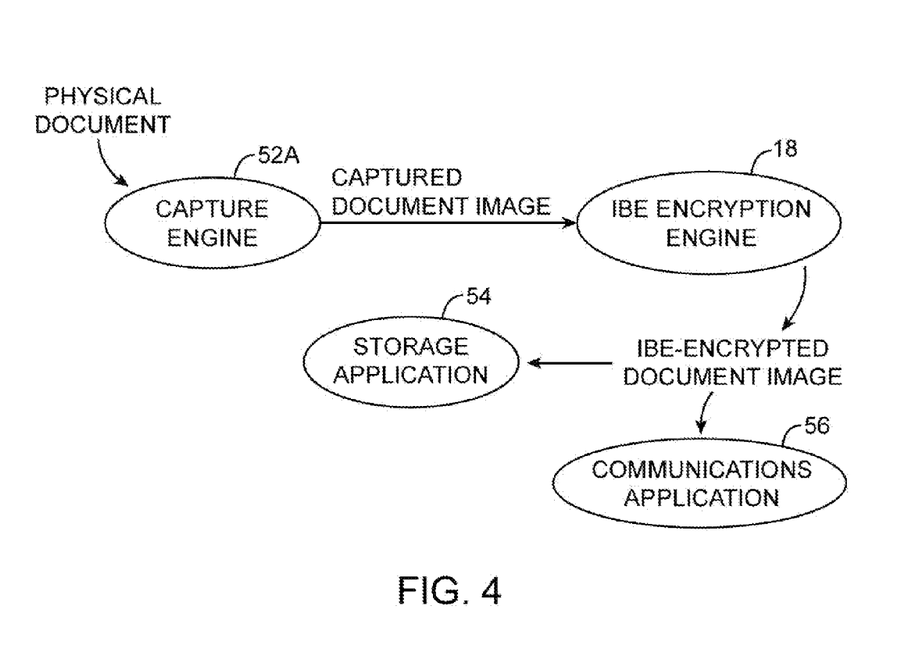
FIG. 4 is a diagram of an illustrative process flow for handling a captured image in accordance with an embodiment of the present invention.

An illustrative arrangement for handling documents in which it is not desired to perform optical character recognition operations is shown in FIG. 4. As shown in FIG. 4, a physical document may be converted into a captured document image using capture engine 52A or other suitable application 52 for image acquisition that is implemented on document imaging equipment 12A. The captured document image may be encrypted using an IBE encryption engine 18 that is implemented using processing circuitry 36 on document imaging equipment 12A. In performing encryption, a user at document imaging equipment 12A may be prompted to supply information for constructing an IBE public key. For example, a user may be prompted to supply identity information (e.g., an identifier ID) that is associated with an intended recipient. The ID may be provided in any suitable form (e.g., as an email address associated with a recipient, as the name of a network folder into which the document is to be stored, etc.). The user may supply the ID by typing the ID into document imaging equipment 12A using buttons or other suitable input-output equipment 53 or may be selected from a list.

After encryption, the IBE-encrypted document image may be stored on card 44 or storage 54 or in a network folder such as a folder on networked storage 50 (FIG. 3) by storage application 54 or may be transmitted to an intended recipient over network 14 using an email program or other suitable communications application 56 (FIG. 3).

Figure 5:
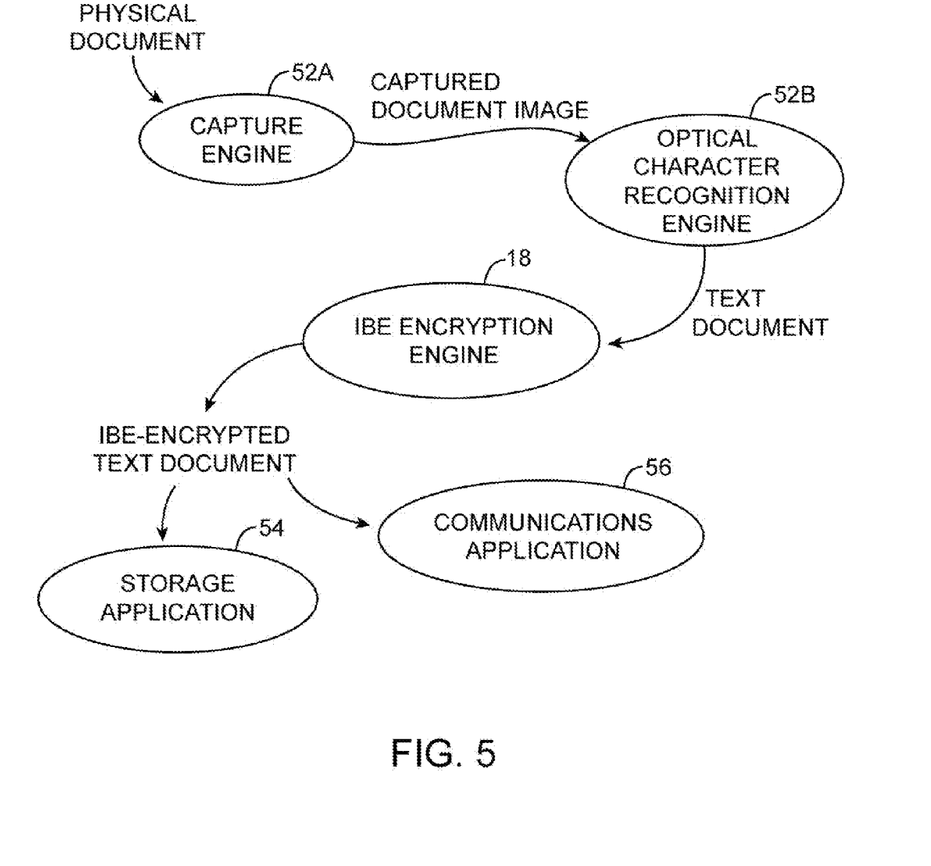
FIG. 5 is a diagram of an illustrative process flow for handling a captured image using image processing applications such as an optical character recognition application in accordance with an embodiment of the present invention.

When it is desired to perform image processing operations such as optical character recognition processing operations on an acquired image of a document, an arrangement of the type shown in FIG. 5 may be used. As shown in FIG. 5, an item that contains text (and possibly images) such as a printed paper or other physical document may be converted into a captured document image using capture engine 52A. Capture engine 52A may run on processing circuitry 36 and may perform image acquisition operations using image acquisition device 34. The captured document image may be processed using optical character recognition application 52B. Optical character recognition application 52B may run on processing circuitry 36. During optical character recognition processing of the captured document image, application 52B can extract text from the captured document image to create a corresponding text version of the document. The processed document includes text and may therefore sometimes be referred to as a text document. Documents that are stored in text format (e.g., as ".txt" files) may be more compact than graphics-based documents and may be more amenable to editing using commonly-available word processing software.

Following conversion to text, the IBE encryption engine 18 running on processing circuitry 36 may encrypt the text version of the document. During encryption, a user at document imaging equipment 12A may provide information such as a network folder name or recipient email address that is used in constructing an IBE public key for engine 18. The user may supply this information using a keypad or other input-output device 53 on equipment 12A.

Following encryption, the IBE-encrypted text version of the document image may be stored in storage 38 or 44 or in a network folder such as a folder on networked storage 50 (FIG. 3) by storage application 54 or may be sent to a user over network 14 using an email program or other suitable communications application 56 (FIG. 3).

During IBE encryption operations such as the operations used to encrypt the captured document image of FIG. 4 and the operations used to encrypt the text version of the captured document images of FIG. 5, IBE encryption engine takes the unencrypted document image as an input and, using IBE public parameter information from key server 16 and an IBE public key, creates the corresponding IBE-encrypted version of the document image. In performing these IBE encryption operations, any suitable format may be used for the IBE public key. Typical scenarios are illustrated in the table of FIG. 6.

Figure 6:
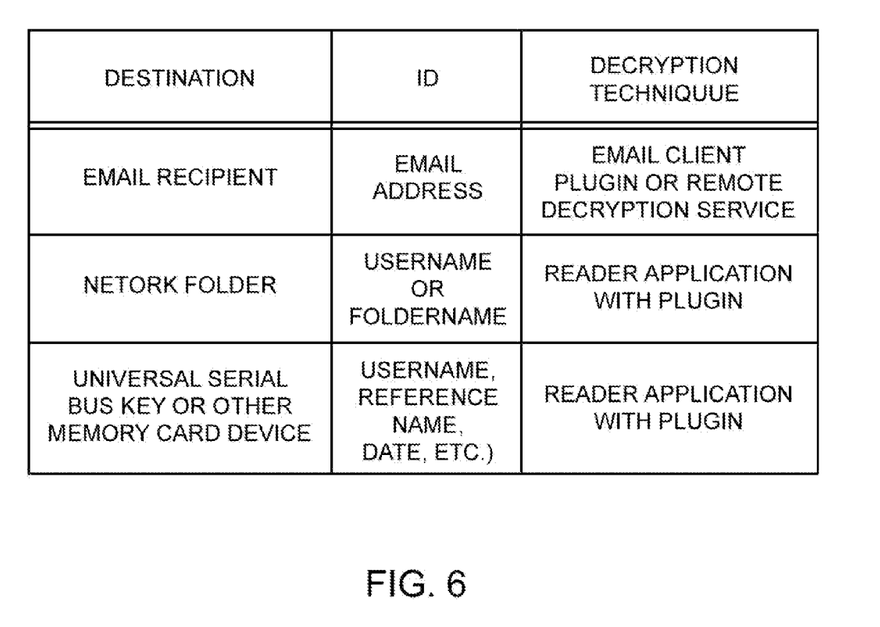
FIG. 6 is a table of illustrative arrangements for handling captured document images in a system of the type shown in FIG. 3 in accordance with an embodiment of the present invention.

As shown in the first row of the table of FIG. 6, a user at document imaging equipment 12A may be scanning a document that is to be sent directly from the document imaging equipment 12A to an email recipient. The user at equipment 12A may, for example, be associated with an organization and may desire to send the scanned document in an email to another user that is associated with the organization (e.g., a co-worker), may desire to send the scanned document in an email to himself, or may desire to send the scanned document in an email to a user who is external to the organization. Using buttons on document imaging equipment 12A, the user may select from a list of predefined email addresses or may enter a new email address. As indicated in the second column of the first row of the table of FIG. 6, the selected email address may serve as an ID from which to construct the IBE public key for use by IBE encryption engine 18. As indicated by the third column of the first row of the FIG. 6 table, a recipient of the IBE-encrypted document may use an email client plug-in or a remote decryption service (e.g., a decryption service implemented on IBE key server 16 of FIG. 3) to perform IBE decryption of the IBE-encrypted document.

As shown in the second row, another possible destination for the scanned document is a network folder or database. Document imaging equipment 12A may be connected to a server on a local area network or other network (e.g., a network associated with an organization). The operating system running on the server may be used to maintain file folders into which scanned documents may be directed from document imaging equipment 12A (e.g., using storage application 54 or using functionality built into image acquisition application 52). In this type of scenario, the scanned document may be placed into a network folder having a particular folder name. The user performing the scan may have a username. Using buttons or other input-output devices 53 on document imaging equipment 12A, the user may provide information on the folder name of the destination folder or the username of the user. As indicated in the second column of the second row of the table of FIG. 6, the username or folder name may serve as an ID from which to construct the IBE public key for use by IBE encryption engine 18. When it is desired to access the contents of the IBE-encrypted document image, a user (either the user who scanned the document at equipment 12A or another user) may retrieve the encrypted version of the document from the network folder using a reader application. The reader application may be, for example, a word processing application or a document imaging program. The reader application may have an IBE decryption engine plug-in that is used in decrypting the IBE-encrypted document image retrieved from the network folder.

Another illustrative scenario is illustrated in the third row of the table of FIG. 6. In this situation, a user is storing the scanned document onto a universal serial bus (USB) memory key 44 or other removable memory that is attached to document imaging equipment 12A via input-output circuitry 42 (FIG. 3). As indicated in the second column of the third row of the FIG. 6 table, IDs that may be used for forming the IBE public encryption key include a username associated with the scanning user or a date. The ID may also be based at least partly on a reference name such as a reference name associated with a work matter, a reference name associated with a file (e.g., a docket number), a reference name associated with customer of the user's organization, etc.

Following encryption, the removable memory device that contains the IBE-encrypted document image may be transferred to a suitable location for document retrieval. For example, the memory device may be inserted into a card reader associated with computing equipment 12B (e.g., the user's personal computer or the personal computer of another user). At this computer, a reader application with a plug-in may be used to retrieve the IBE-encrypted document image from the memory device and to decrypt the retrieved document for the user.

Figure 7:
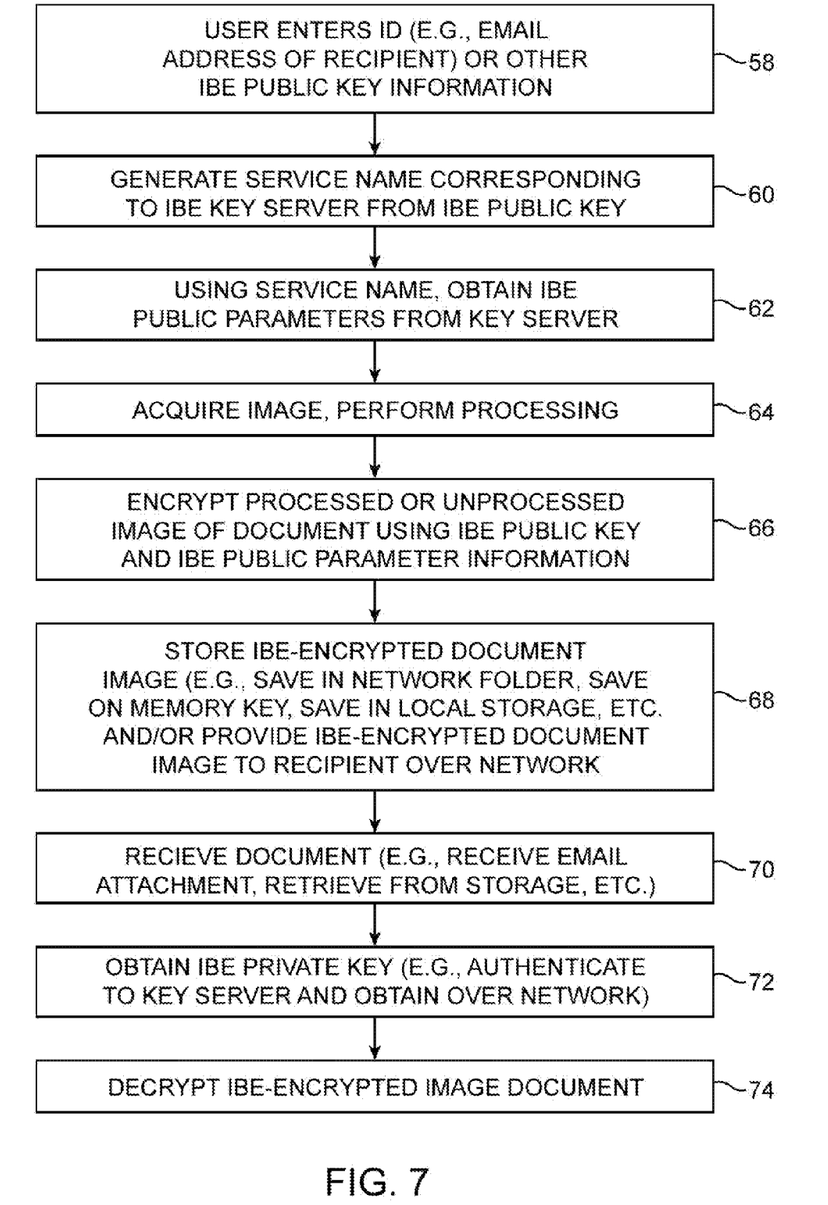
FIG. 7 is a flow chart of illustrative steps involved in using IBE-enabled image acquisition equipment to securely handle captured images in accordance with an embodiment of the present invention.

Illustrative steps involved in using document imaging equipment 12A with IBE encryption capabilities to securely handle documents in system 10 are shown in FIG. 7.

At step 58, a user desiring to scan a document using document imaging equipment 12A may prepare document imaging equipment 12A for the encryption process by entering an ID. The user may, for example, use input-output devices 53 such as a keypad, touchpad, touch screen, etc. to select or otherwise provide an email address of a recipient, a folder name, a username, a reference name, a date, or other suitable identity information for use in constructing an IBE public key. The user may make a selection from preexisting IDs or may enter all or part of the ID using input-output interface 53. The IBE public key may be constructed from the supplied ID using known rules. If desired, the user may select from a list of available IBE public keys displayed on input-output interface 53.

At step 60, document imaging equipment 12A may obtain information on the location of IBE key server 16 or other suitable host of the IBE public parameter information. With one suitable arrangement, the information on the location of IBE key server 16 may be a service name in the form of a universal resource locator (URL) that specifies the Internet location of key server 16. The URL may be constructed from known rules (e.g., by forming the URL from part of the recipient ID or IBE public key that specifies an organization associated with a desired recipient of the IBE-encrypted document image) or may be retrieved from storage.

At step 62, using the URL or other information on the location of the IBE public parameter host (e.g., the URL of key server 16), document imaging equipment 12A (e.g., the IBE encryption 18 on equipment 12A) may request and obtain the IBE public parameter information from key server 16 over network 14. If desired, this information may be cached (e.g., in storage 38), so that subsequent encryption operations need not involve IBE public parameter requests to IBE key server 16. This type of arrangement may be advantageous, for example, in systems in which equipment 12A is not always (or is never) connected to key server 16 over network 14. In arrangements in which equipment 12A is not connected to key server 16 over network 14, other delivery mechanisms may be used for providing the IBE public parameter information from key server 16 to equipment 12A (e.g., delivery on a media disk, delivery on a memory card, delivery via wired or wireless transmission from an intermediary device such as a laptop computer or handheld device that has previously been loaded with the IBE public parameter information, manual entry using input-output devices associated with equipment 12A, etc.).

At step 64, applications 52 may use image acquisition device 34 to scan a physical document or otherwise acquire a document image. If desired, post-processing operations such as optical character recognition processing may be performed on the acquired document image using applications 52.

At step 66, the document image may be encrypted using IBE encryption engine 18 running on document imaging equipment 12A. The IBE encryption engine uses the unencrypted version of the document image, the IBE public parameters, and the IBE public key from step 58. With this approach, the document image need not be transferred from equipment 12A in its unencrypted state.

At step 68, the IBE-encrypted document image may be stored by storage application 54 (e.g., in storage 38, storage 44, storage 50, etc.) or may be sent to a recipient using communications application 56 (e.g., by sending the IBE-encrypted document image in an email).

At step 70, the recipient (e.g., a recipient at computing equipment 12B of FIG. 3 or other user in system 10) may receive the transmitted version of the IBE-encrypted document image or may retrieve the stored version of the IBE-encrypted document image (e.g., by retrieving the IBE-encrypted document image from shared storage or a memory card that has been physically transferred to the recipient's equipment).

At step 72, the recipient may obtain an IBE private key for decryption from IBE key server 16 over network 14. The key request may include the IBE public key that was used during decryption so that the key server is informed as to which IBE private key should be generated. Key server 16 may authenticate the requesting user and, if the user is authorized, may generate the requested IBE private key. The IBE private key may be provided to the user over network 14 (e.g., using a secure path). The IBE private key may be cached at the recipient.

At the recipient, the IBE private key may be used in an IBE decryption engine to decrypt the IBE-encrypted image document (step 74). If desired, the user that receives the IBE-encrypted document image from document imaging equipment 12A at step 70 may decrypt the document image using a remote decryption service such as a cryptographic service associated with key server 16. Once decrypted (either remotely or using a locally implemented IBE decryption engine), the user may access the document image.

If desired, a rules engine in system 10 may be used in evaluating text documents that have been produced by document imaging equipment 12A. The rules engine may be implemented on document imaging equipment 12A, as indicated by rules engine 57 of FIG. 3. Rules engine 57 may be implemented using software that runs on hardware in document imagine equipment 12A (e.g., processing circuitry 36 and storage 38).

Rules engine 57 may be used to determine which document images require encryption. By evaluating captured documents in this way, documents that contain sensitive information may be automatically secured. This may help to minimize mistakes due to human error (e.g., when users forget to invoke encryption). The evaluation process may involve, for example, examination of the captured document image following optical character recognition operations to determine whether the document contains sensitive words, phrases, or other characteristics. As an example, rules engine 57 can be configured to encrypt all documents that contain the word "patient" or "diagnosis."

Rules engine 57 can perform its analysis using any suitable input. The types of inputs that are used may be set up in advance (e.g., by default or in response to user input) and may include user-defined or default evaluation data (e.g., user-defined or default sensitive words).

In general, rules engine 57 may use as inputs (1) the text version of the captured document image, (2) a graphics version of the captured document image, (3) information on the identity of the encrypting user, (4) information on the intended recipient of the document (e.g., a networked folder, a remote user, a removable storage media of the encrypting user, etc.), (5) information on the current date, etc.

Rules engine 57 may examine the text of the document for keywords or patterns of keywords (e.g., phrases). These keywords might, for example, include the names of certain individuals or types of individuals or be otherwise indicative of sensitive document content (e.g., document related to medical or financial information, etc.).

Rules engine 57 may analyze the graphics version of a document to determine whether the document contains particular types of content. For example, image-based document analysis may reveal whether a document contains color, handwriting, lines, etc. Using this information, rules engine 57 may decide that all color images need to be encrypted, that all computer-aided-design drawings may need to be encrypted, that all documents with handwriting may need to be encrypted, etc.

Rules engine 57 may use information on the identity of the encrypting user in deciding how to process a document image. For example, all documents that are scanned by a particular user may need to be encrypted or all documents scanned by a particular type of user at a particular time might need to be encrypted.

Information on the recipient of the document may be used by rules engine 57 to determine whether the document should be encrypted or left unencrypted. If, for example, the recipient is typically associated with sensitive information, rules engine 57 may conclude that all documents destined for that user should be encrypted by IBE encryption engine 18.

Date information (including information on the current time) may be used by rules engine 57 in making encryption decisions. For example, rules engine 57 may decide to encrypt all documents that are captured after normal business hours or on weekends or may decide to encrypt documents that are produced during a particular time periods (e.g., from 9:00 AM to 11:00 AM).

If desired, rules engine 57 may accept manual input. For example, a user may specify that a given document should be encrypted, regardless of whether encryption is required based on the analysis of rules engine 57.

Combinations of these factors and other factors may also be used by rules engine 57 in determining whether or not to encrypt a particular captured document image.

Figure 8:
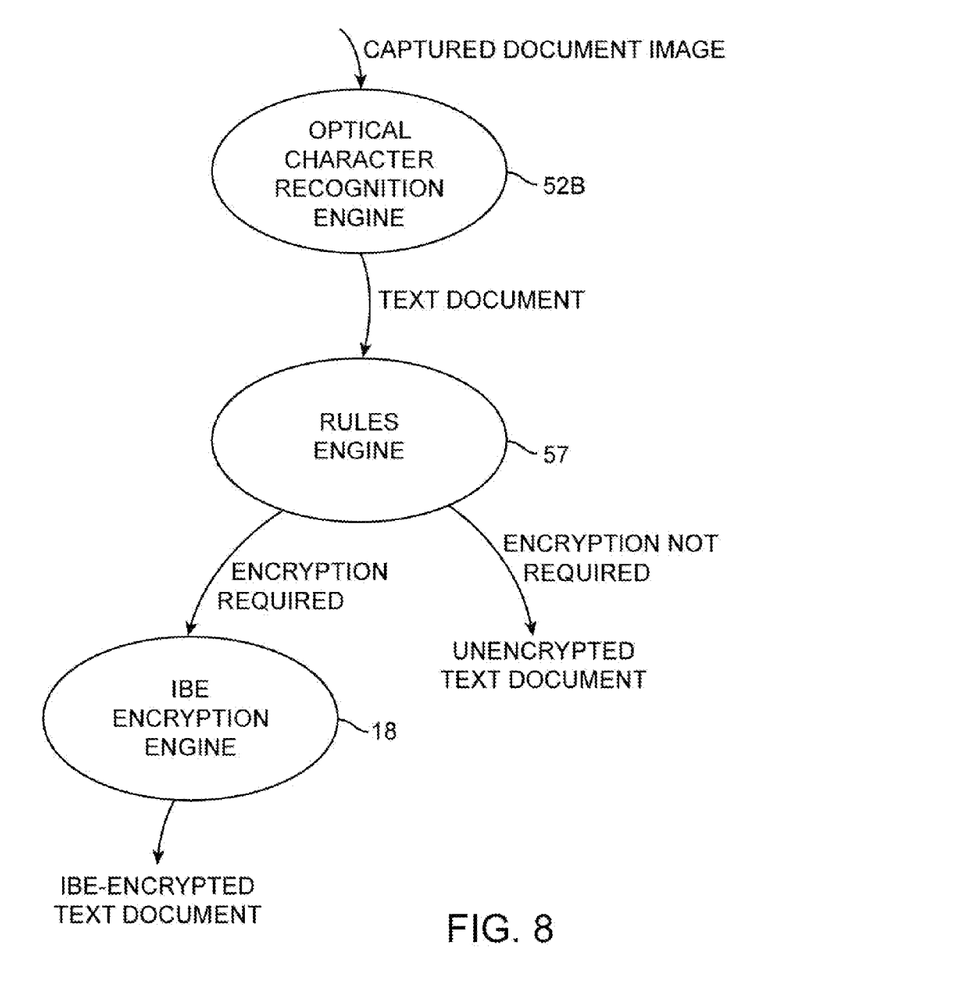
FIG. 8 is a diagram of an illustrative process flow for using a rules engine in handling a captured image that has been processed by an optical character recognition engine in accordance with an embodiment of the present invention.

Illustrative operations involved in analyzing documents using a rules-based approach are shown in FIG. 8. In FIG. 8, rules engine 57 is described as analyzing documents based on their text content as an example. As shown in FIG. 8, a captured document image may be processed by optical character recognition engine 52B. Optical character recognition engine 52B produces a text version of the document as an output. It may be less burdensome on the processing circuitry of document imaging equipment 12A to process text files than image-base files. Text processing also allows rules engine 57 to examine documents for the presence of sensitive keywords.

After the captured document image has been converted to text document form by optical character recognition engine 52B, rules engine 57 may analyze the text document. Rules engine 57 may, for example, determine whether the text document contains sensitive keywords or patterns of keywords, etc. External input (e.g., input on the date, etc.) may be used by rules engine 57 in combination with the text analysis results to determine whether or not the document should be encrypted. If encryption is not warranted, rules engine 57 may allow the unencrypted text document to be used by other applications. If encryption is warranted, rules engine 57 may direct IBE encryption engine 18 to perform IBE encryption on the text document. IBE encryption engine 18 may output an IBE-encrypted version of the text version of the captured document image.

The foregoing is merely illustrative of the principles of this invention and various modifications can be made by those skilled in the art without departing from the scope and spirit of the invention.

What is claimed is:

1. A method for using identity-based encryption (IBE) to secure document images produced by document imaging equipment, comprising:
    at the document imaging equipment, acquiring a document image with an image acquisition device, wherein the document imaging equipment is a scanner and wherein acquiring the document image comprises scanning a printed document with the image acquisition device;
    with input-output circuitry in the scanner, obtaining an identifier from a user;
    at the document imaging equipment, constructing an IBE public key from the identifier;
    with a rules engine implemented on the document imaging equipment, analyzing a graphics version of the acquired document image to determine whether the acquired document image contains a feature selected from the group consisting of color, handwriting, and lines from computer-aided-design drawings;
    determining whether to encrypt the acquired document image based on whether the acquired document image contains the feature; and
    with an IBE encryption engine at the document imaging equipment, if it has been determined by the rules engine to encrypt the acquired document image, encrypting the acquired document image to produce an IBE-encrypted document image wherein encrypting the acquired document image comprises encrypting the acquired document image using the IBE public key.

2. The method defined in claim 1 further comprising:
    storing the IBE-encrypted document image in storage in the scanner.

3. The method defined in claim 1 further comprising:
    storing the IBE-encrypted document image in removable storage connected to the scanner.

4. The method defined in claim 1 wherein the scanner is connected to a network, the method further comprising:
    storing the IBE-encrypted document image in a network folder maintained on a networked storage device in the network.

5. The method defined in claim 1 further comprising:
    with a communications application implemented on the scanner, sending the IBE-encrypted document image to a recipient over a network.

6. The method defined in claim 1 further comprising:
    with an email application implemented on the scanner, sending the IBE-encrypted document image to a recipient over a network in an email.

7. The method defined in claim 1 further comprising:
    storing IBE public parameter information in storage in the scanner.

8. The method defined in claim 1 further comprising:
    receiving the IBE-encrypted document image from the scanner;
    obtaining an IBE private key from an IBE private key server; and
    decrypting the IBE-encrypted document image using the IBE private key.

9. The method defined in claim 8 wherein receiving the IBE-encrypted document image from the scanner comprises receiving the IBE-encrypted document image over a network.

10. The method defined in claim 8 wherein receiving the IBE-encrypted document image from the scanner comprises:
    at the scanner, storing the IBE-encrypted document image in a removable storage device; and
    at computing equipment remote to the scanner, retrieving the stored IBE-encrypted document image from the removable storage device.

11. The method defined in claim 1 wherein encrypting the acquired document image comprises encrypting the acquired document image using an IBE public key entered into the scanner by a user.

12. The method defined in claim 1 further comprising:
    with an optical character recognition application running on the scanner, extracting text from the acquired document image to produce a text version of the acquired document image, wherein encrypting the acquired document image comprises encrypting the text version of the acquired document image.

13. The method defined in claim 1 wherein the identifier comprises a folder name, the method further comprising:
    storing the IBE-encrypted document image in storage in the scanner.

14. The method defined in claim 1 wherein the identifier comprises a reference name, the method further comprising:
    storing the IBE-encrypted document image in removable storage connected to the scanner.

15. The method defined in claim 1 wherein the identifier comprises a reference name and wherein the scanner is connected to a network, the method further comprising:
    storing the IBE-encrypted document image in a network folder maintained on a networked storage device in the network.

16. The method defined in claim 1 wherein the identifier comprises a username, the method further comprising:
    with a communications application implemented on the scanner, sending the IBE-encrypted document image to a recipient over a network.

17. The method defined in claim 1 further comprising:
    storing IBE public parameter information in storage in the scanner, wherein encrypting the acquired document image comprises encrypting the acquired document image using the stored IBE public parameter information.

18. A method for using identity-based encryption (IBE) to secure document images produced by document imaging equipment, comprising:

at the document imaging equipment, acquiring a document image with an image acquisition device, wherein the document imaging equipment is a scanner and wherein acquiring the document image comprises scanning a printed document with the image acquisition device;

with a rules engine implemented on the document imaging equipment, determining whether to encrypt the acquired document image based on whether the acquired document image contains a feature selected from the group consisting of color, handwriting, and lines from computer-aided-design drawings; and with an IBE encryption engine at the document imaging equipment, encrypting the text version of the acquired document image to produce an IBE-encrypted document if it has been determined by the rules engine to encrypt the acquired document image.

19. The method defined in claim 18, further comprising determining whether to encrypt the acquired document image based on an identity of a user.

20. The method defined in claim 18, further comprising determining whether to encrypt the acquired document image based on manual input from a user.

21. The method defined in claim 18, further comprising determining whether to encrypt the acquired document image based on date information.

\* \* \* \* \*